(12) United States Patent
Martin et al.

(10) Patent No.: US 8,661,331 B2
(45) Date of Patent: Feb. 25, 2014

(54) METHOD OF PROVIDING VISUAL ACCESS TO COMMENT MARKINGS

(75) Inventors: Nathaniel G. Martin, Rochester, NY (US); Wendell L. Kibler, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 3705 days.

(21) Appl. No.: 10/852,441

(22) Filed: May 24, 2004

(65) Prior Publication Data

US 2005/0261949 A1 Nov. 24, 2005

(51) Int. Cl.
*G06Q 10/00* (2012.01)

(52) U.S. Cl.
USPC .......................... 715/232; 715/230

(58) Field of Classification Search
USPC ...................... 705/8; 715/230, 232
See application file for complete search history.

(56) References Cited

U.S. PATENT DOCUMENTS

| | | | | |
|---|---|---|---|---|
| 5,459,307 | A | 10/1995 | Klotz, Jr. ................ | 235/454 |
| 6,330,976 | B1 | 12/2001 | Dymetman et al. ........ | 235/487 |
| 7,298,930 | B1* | 11/2007 | Erol et al. ................ | 382/305 |
| 7,299,405 | B1* | 11/2007 | Lee et al. ................ | 715/700 |
| 7,337,389 | B1* | 2/2008 | Woolf et al. .............. | 715/230 |
| 2002/0059342 | A1* | 5/2002 | Gupta et al. .............. | 707/512 |
| 2005/0114521 | A1* | 5/2005 | Lee et al. ................ | 709/228 |
| 2005/0144258 | A1* | 6/2005 | Burckart et al. .......... | 709/218 |

OTHER PUBLICATIONS

Chiu, et al. "Notelook: Taking Notes in Meetings with Digital Video and Ink", (C) 1999, ACM, pp. 149-158.*
Information Visualization for Collaborative Computing☐☐H Chen, J Nunamaker Jr, R Orwig, O Titkova—Computer, 1998—doi. ieeecomputersociety.org.*
Knowledge Management As an Economic Development Strategy☐☐KP Jarboe, A Alliance—Reviews of Economic Development Literature and Practice, 2001—athenaalliance.org.*
Cmew/U—A Multimedia Web Annotation Sharing System☐☐Hirotsu, et al, NTT Network Innovation Laboratories, © 1999, IEEE Tencon, pp. 356-359.*
Annotation: from paper books to digital library Marshall, Catherine; 1997, International Conference on Digital Libraries, ACM, pp. 131-140.*
Manipulating and Annotating Slides in a Multi-Display Environment Chiu, et al; Proceedings of Interact 2003, pp. 1-8.*
Free online dictionary definition of "print", 6 pages.*

* cited by examiner

*Primary Examiner* — Jonathan G Sterrett
(74) *Attorney, Agent, or Firm* — Gibb & Riley, LLC

(57) ABSTRACT

Meeting documents are provided to N meeting participants of a meeting. Each meeting document comprises a human-readable content marking related to the subject of the meeting and a storage address marking. At the meeting, the meeting participants supply comment markings to the meeting documents, thus forming commented meeting documents. The commented meeting documents are then scanned to form commented meeting document images. The commented meeting document images are then stored in a repository based on the storage address marking. One or more users are then provided with visual access to the commented meeting documents images, thus enabling the one or more users to view the comment markings that are supplied by the meeting participants.

25 Claims, 3 Drawing Sheets

METHOD OF PROVIDING VISUAL ACCESS TO COMMENT MARKINGS

BACKGROUND OF THE INVENTION

It is common for meeting participants to take notes or make comment markings on paper meeting documents that are distributed at meetings. The participants use paper because it is easy to mark in a free format. Frequently, the paper on which they take notes have the presentation slides or other meeting content information printed on them to allow synchronization between the talk or meeting and the comment markings.

One disadvantage of taking notes or making comment markings on meeting documents is the difficulty of sharing the notes or comment markings.

Thus, there is a need to provide common visual access to comment markings that are supplied by meeting participants at a meeting.

BRIEF SUMMARY OF THE INVENTION

In one aspect of the invention, there is described a method of providing visual access to comment markings that are supplied by a plurality of N meeting participants, the method comprising (a) providing one or more meeting documents to the N meeting participants, wherein each meeting document comprises a human-readable content marking related to the subject of the meeting and a storage address marking; (b) by the meeting participants, supplying one or more comment markings to the one or more meeting documents, thus forming one or more commented meeting documents; (c) scanning the one or more commented meeting documents to form one or more commented meeting document images; (d) storing the one or more commented meeting document images in a repository based on the storage address marking; and (e) providing one or more users with visual access to the one or more commented meeting documents images, thus enabling the one or more users to view the one or more comment markings that are supplied by the meeting participants.

DESCRIPTION OF THE INVENTION

Briefly, meeting documents are provided to N meeting participants of a meeting. Each meeting document comprises a human-readable content marking related to the subject of the meeting and a storage address marking. At the meeting, the meeting participants supply comment markings to the meeting documents, thus forming commented meeting documents. The commented meeting documents are then scanned to form commented meeting document images. The commented meeting document images are then stored in a repository based on the storage address marking. One or more users are then provided with visual access to the commented meeting document images, thus enabling the one or more users to view the comment markings that are supplied by the meeting participants.

Figure 1:
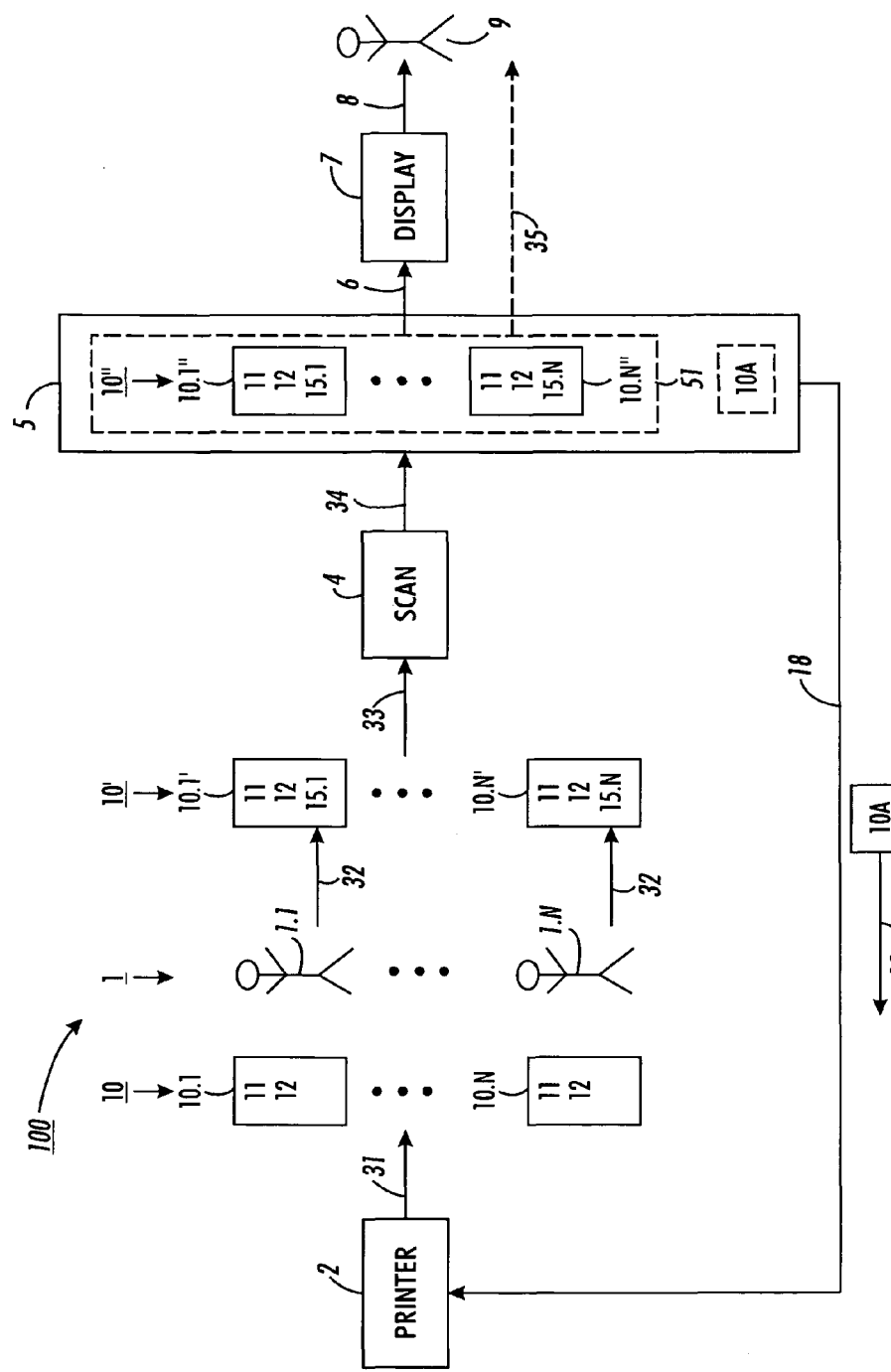
FIG. 1 depicts a system 100 that is useful for depicting a method of providing visual access to comment markings, in accordance with the present invention.

Referring now to FIG. 1, there is depicted a system 100 that is useful for depicting a method of providing visual access to comment markings, in accordance with the present invention. As shown, a printer 2 provides the meeting documents 10 to a plurality of N meeting participants 1 depicted by the reference numbers 1.1-1.N.

The providing of the meeting documents 10 to the meeting participants 1 is depicted by the arrow 31.

As shown, the meeting documents 10 are provided by the printer 2 based on meeting document information 10A that is stored in an associated document repository 5 and transmitted to the printer 2 by means of a suitable channel or link 18.

The transmitting of the meeting document information 10A is depicted by the arrow 19.

In one embodiment, each of the N meeting participants 1 is provided with at least one meeting document 10.

In one embodiment, each of the N meeting participants 1 is provided with exactly one meeting document 10. Hence, the meeting documents 10 comprise N meeting documents 10.1-10.N, with meeting document 10.1 being provided to meeting participant 1.1, meeting document 10.2 provided to meeting participant 1.2, and so forth, and with meeting document 10.N provided to meeting participant 1.N.

Figure 2:
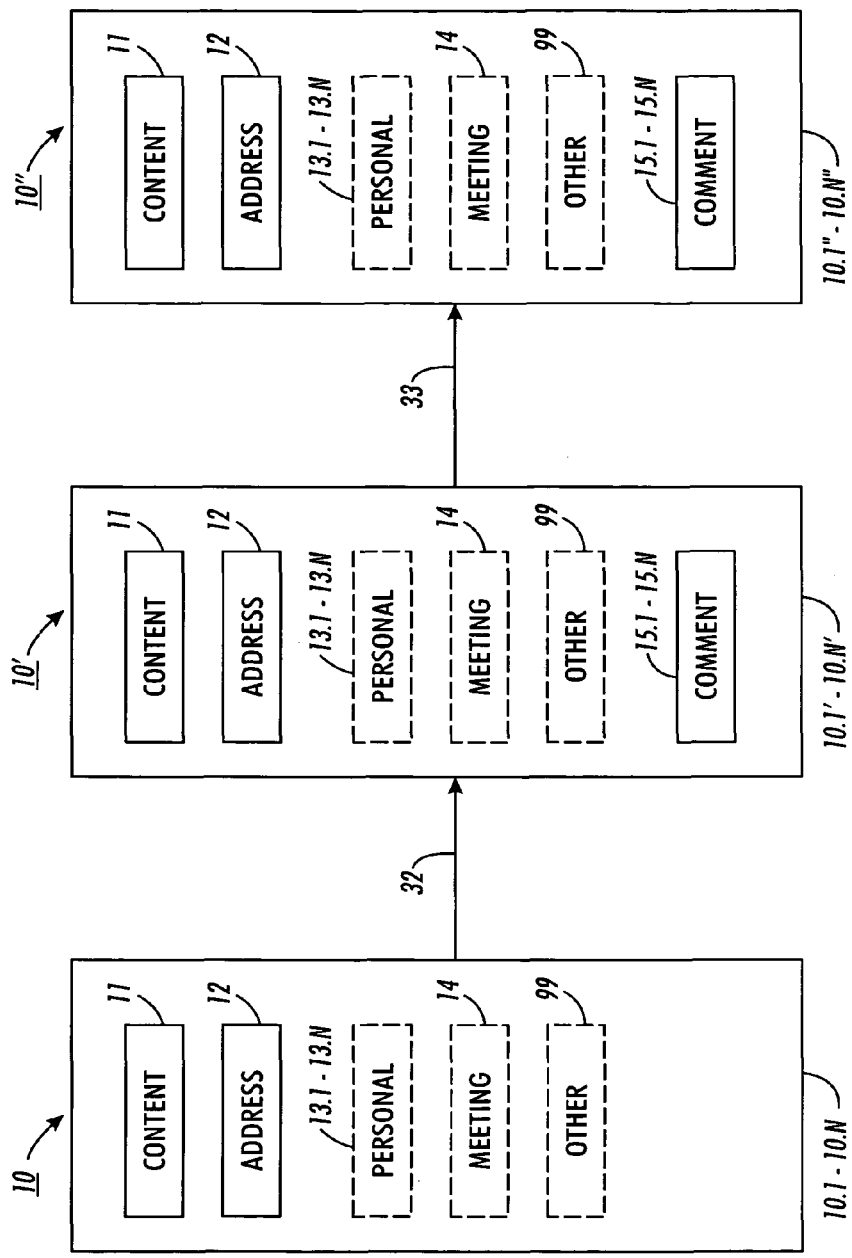
FIG. 2 depicts N meeting documents 10, as depicted by the reference numbers 10.1-10.N. Also shown are N corresponding commented meeting documents 10', as depicted by the reference numbers 10.1'-10.N'. Also shown are N corresponding commented meeting document images 10", as depicted by the reference numbers 10.1"-10.N".

Referring now to FIG. 2, there are depicted the N meeting documents 10, each meeting document 10.1-10.N comprising a human-readable content marking 11 that is related to the subject of the meeting.

As shown in FIG. 2, each meeting document 10 further comprises a storage address marking 12 corresponding to a predetermined storage location 51 in the repository 5. In one embodiment, the storage address marking 12 is machine-readable. In one embodiment, the storage address marking 12 is invisible to the human eye. In one embodiment, the storage address marking 12 comprises a bar code. In one embodiment, the storage address marking 12 comprises a data glyph.

Still referring to FIG. 2, in one embodiment, the meeting documents 10 further comprise a personal marking 13. Thus, each meeting document 10.1-10.N comprises a unique personal marking 13.1-13.N which personal marking identifies the corresponding individual meeting participant 1.1-1.N to whom each meeting document 10 is provided. In one embodiment, the personal marking 13 is machine-readable. In one embodiment, the personal marking 13 is invisible to the human eye. In one embodiment, the personal marking 13 comprises a bar code. In one embodiment, the personal marking 13 comprises a data glyph.

Still referring to FIG. 2, in one embodiment, the meeting documents 10 further comprises a meeting marking 14 that identifies or describes the meeting. In one embodiment, the meeting marking 14 is machine-readable. In one embodiment, the meeting marking 14 is invisible to the human eye. In one embodiment, the meeting marking 14 comprises a bar code. In one embodiment, the meeting marking 14 comprises a data glyph.

It will be understood that the storage address marking 12, the personal marking 13 and the meeting marking 14 comprise metadata.

Still referring to FIG. 2, in one embodiment, the meeting documents 10 further comprise one or more other markings 99 that provide other information. In one embodiment, the other markings 99 comprise metadata. In one embodiment, the other markings 99 are machine-readable. In one embodiment, the other markings 99 are invisible to the human eye. In one embodiment, the other markings 99 comprise one or more bar codes. In one embodiment, the other markings 99 comprise one or more data glyphs.

Returning to FIG. 1, as shown, once the meeting documents 10 have been provided to the meeting participants 1, the meeting participants 1 proceed to take notes on the meeting documents 10. Thus, the meeting participants 1 supply one or more comment markings 15 to the meeting documents 10, thus forming corresponding commented meeting documents 10'.

The supplying of the comment markings 15 to the meeting documents 10 by the meeting participants 1 is depicted by the arrows 32.

In one embodiment, the comment markings 15 are supplied to the meeting documents 10 by means of marking devices such as, for example, suitable hand-held marking devices. Some examples of typical hand-held marking devices include pens, pencils, ink markers, crayons, brushes, and the like.

Referring momentarily to FIG. 2, there are shown the N commented meeting documents 10' depicted by the reference numbers 10.1'-10.N'. As shown, the N commented meeting documents 10.1'-10.N' comprise the comment markings 15 depicted by the reference numbers 15.1-15.N.

Still referring to FIG. 2, the supplying of the comment markings 15 to the meeting documents 10 to form the commented meeting documents 10' is depicted by the arrow 32.

Returning to FIG. 1, as shown, once the commented meeting documents 10' are formed, the commented meeting documents 10' thereafter are scanned by an associated scanner 4 to form corresponding commented meeting document images 10".

The scanning of the commented meeting documents 10' is depicted by the arrow 33.

Referring again momentarily to FIG. 2, there are shown the N commented meeting document images 10" depicted by the reference numbers 10.1"-10.N". As shown, the N commented meeting document images 10" comprise the comment markings 15 that have been supplied by the meeting participants 1, the comment markings 15 being depicted by the reference numbers 15.1-15.N.

Still referring to FIG. 2, the scanning of the commented meeting documents 10' to form the commented meeting document images 10" is depicted by the arrow 33.

Returning to FIG. 1, the commented meeting document images 10" then are stored in the repository 5.

The storing of the commented meeting document images 10" is depicted by the arrow 34.

Still referring to FIG. 1, the repository 5 is coupled to a suitable display terminal 7 by means of a suitable link or channel 6 to provide one or more users 9 with visual access 8 to the commented meeting document images 10" in the repository 5. As a result, the one or more users 9 are provided with visual access to the included one or more comment markings 15 that have been supplied by the meeting participants 1. Thus, the one or more users 9 are able to view the one or more comment markings 15.

The providing of visual access to the one or more comment markings 15 is depicted by the arrow 35.

In one embodiment, the one or more users 9 comprise any or all of the N meeting participants 1.

Figure 3:
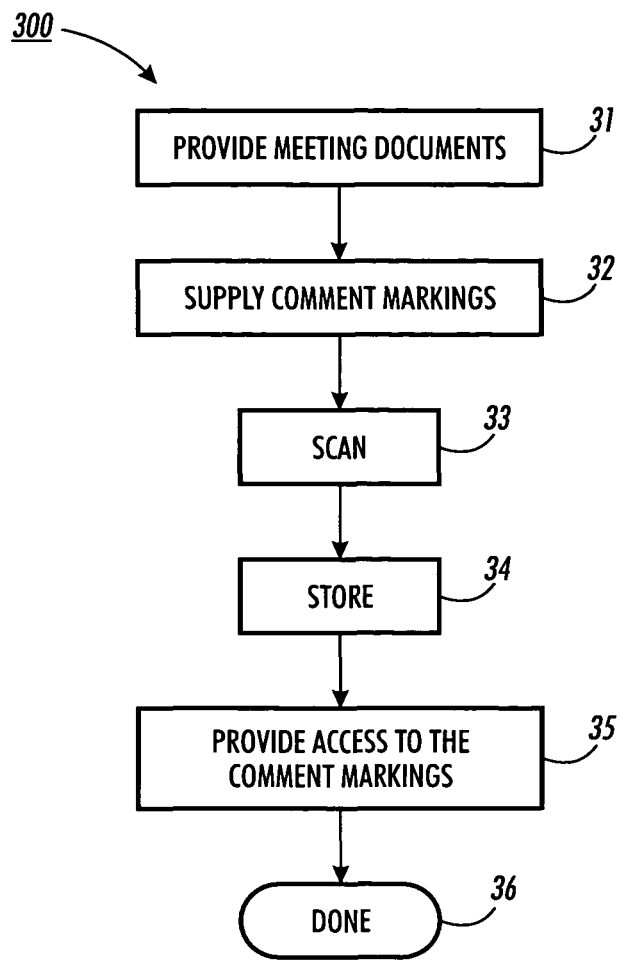
FIG. 3 depicts a first embodiment of a flow diagram 300 of a method of providing visual access to comment markings, in accordance with the present invention.

Referring now to FIG. 3, there is depicted a first embodiment of a flow diagram 300 of the present method or process of providing visual access 35 to the one or more comment markings 15 that are supplied by the plurality of N meeting participants 1. As shown, the method comprises steps 31-36. The process starts at step 31.

In step 31, the process provides meeting documents 10 to the N meeting participants 1. As discussed in connection with FIGS. 1 and 2 above, each meeting document 10 comprises a human-readable content marking 11 that is related to the subject of the meeting and a storage address marking 12. Step 31 corresponds to the arrow 31 that is depicted in FIG. 1.

After step 31, the process goes to step 32.

In step 32, the meeting participants 1 supply one or more comment markings 15 to the meeting documents 10, thus forming the commented meeting documents 10'. Step 32 corresponds to the arrows 32 that are depicted in FIGS. 1 and 2.

After step 32, the process goes to step 33.

In step 33, the process scans the commented meeting documents 10' to form the commented meeting document images 10". Step 33 corresponds to the arrows 33 that are depicted in FIGS. 1 and 2.

After step 33, the process goes to step 34.

In step 34, the process stores the commented meeting document images 10" in the repository 5 based on the storage address marking 12. Step 34 corresponds to the arrow 34 that is depicted in FIG. 1.

After step 34, the process goes to step 35.

In step 35, the process provides one or more users 9 with visual access 8 to the commented meeting document images 10" and to the included comment markings 15, thus enabling the users 9 to view the one or more comment markings 15 that are supplied by the meeting participants 1. Step 35 corresponds to the arrow 35 that is depicted in FIG. 1.

Still referring to step 35, as discussed in connection with FIG. 2 above, in one embodiment each meeting document image 10.1-10.N further comprises a personal marking 13.1-13.N that uniquely identifies the corresponding meeting participant 1.1-1.N to whom the corresponding each meeting document 10 is provided. Assuming that each meeting participant 1 supplies comment markings 15 exclusively to the meeting document 10 that is provided to the same meeting participant 1, the users 9 thus are able to identify the individual meeting participants 1 who supplied the comment markings 15 based on the corresponding personal markings 13. Hence, the users 9 are able to identify which individual meeting participants 1 supplied any particular comment markings 15 of interest by decoding the personal markings 13 corresponding to the particular comment markings 15 of interest.

After step 35, the process is then done, step 36.

As described above, this method uses a network connected printer 2, scanner 4 and a computer hosting a document repository 5. Before the meeting, handouts are printed with machine-readable information (e.g. Glyphs) that encode the metadata to be associated with the document. This metadata includes the location in the repository 5 to which they are to be stored. The person to whom the document was given and keyword identifiers may also be attached to aid subsequent search for the notes.

Before the meeting, handouts are prepared for each of the meeting participants. On each page of the handout, the person's name is printed and a glyph that contains an identifier for the person, a location in the document repository to which the scanned image of the notes is to be stored, and any metadata to be associated with that image.

During the meeting, the participants take notes (that is, supply comment markings) on the handouts.

After the meeting, the participants scan the notes they have taken during the meeting. The images from the scanning process are stored in the document repository at the location indicated by the machine-readable information. The metadata associated with the machine-readable metadata is stored with the images.

The images may now be found by searching for the metadata associated with them. The notes taken at the meeting (that is, comment markings supplied to the meeting documents) may be shared among a wider group of people.

Initially, the documents to be used at the meeting are stored in the repository. Before the meeting, the document is removed from the repository and it is combined with metadata that will allow the scanned image of the document to be replaced in the repository so that it can be easily found. For example, the metadata may direct the document to be placed in a collection in the repository where all of the meeting artifacts are being held. Other useful bits of information include who the document was given to and the role of that individual at the meeting. The document is received by the printer 2, and the metadata is printed on the document in an area in which it will not obscure the information encoded in human readable form. The printer prints the document. Because the final form of the document is created by the print driver, the print driver determines the empty spots on the document to add the machine-readable marks. For example, the print driver may decide to print a little less on each page to leave room at the bottom of the page for glyphs. The document is marked-up by the participants in the meeting. These marked-up versions of the document are then scanned to create an image of the document. After scanning, the machine-readable marks on the document are decoded and the metadata on the document is extracted. One piece of the metadata indicates where the document is to be stored. The document repository 5 stores the image of the document at the location indicated in the metadata, and adds whatever other metadata is associated with the document.

The advantage of this system is the notes or comment markings each of the individuals took during the meeting can be collected and shared, providing a collaborative view of the meeting. Even if the notes are kept private, the system can provide a secure means of storing notes from a meeting in a way that are easier to find for later review.

The principal components of this method include the following:

A document print driver that is "metadata aware", meaning that it knows what metadata to include and where to print the data glyph;

A data glyph encoder to store the xml metadata in an image that can be printed with the human readable form;

Scanning system that can direct the output of the scan to a server that can handle decoding data glyphs;

A server that can decode glyphs and interact with the document repository and workflow management system; and Document repository for storing the documents.

Some advantages of this method are now discussed. One advantage is that the method provides an important use for Multi-Function Devices (MFD). If the work practice described herein becomes common, MFD's could become a standard piece of furniture in meeting rooms. Significant numbers of pages would once again be driven through these machines because the paper documents they produce would become an important part of any meeting. Currently, meetings are generating fewer pages on MFD's because slides are presented using projectors, and the image files are available in electronic document repositories. This method leverages the increasingly common use of paper as a temporary display device allowing storage of the information contained on the paper to be re-captured at the end of the meeting.

Some related U.S. patents are now discussed. U.S. Pat. No. 5,459,307, issued Oct. 17, 1995 to Leigh L. Klotz, Jr., "System for storage and retrieval of digitally encoded information on a medium", describes the use of glyphs to encode information on paper that also contains human readable materially partially generated and partially added by the human. This technology allows the metadata to be encoded on the document to be handed out in the meeting and reading that metadata back after the meeting. Also, U.S. Pat. No. 6,330,976, issued Dec. 18, 2001 to Marc Dymetman and Max Copperman, "Marking medium area with encoded identifier for producing action through network", describes the use of machine-readable marks on a document to encode an action over the network. This technology can be used to generate actions over the network to store documents with metadata to capture hand-written notes.

Some extensions of the present method are now described.

In a first extension, storing only added material, the information printed on the document may be removed by comparing the image with an image created from the electronic document and then altering the image so that only the marks added by the note taker remain. In this case, the image of the document with the notes on it is aligned with the image of the document without the notes produced from an electronic version of the document. Each pixel is changed so that only the differences between the pixels remain. To recreate the document with the printed material, the images can be recombined.

In a second extension, encoding more metadata using low visibility channel of black and white document, glyphs can be printed on the yellow channel of a black and white document to allow more metadata to be encoded on the document that the meeting participants mark. Similar, printing that reflects or fluoresces under ultra-violet light could be printed across the entire page. The pattern would be readily visible under ultra-violet light, but would be invisible to the human user.

In a third extension, using a special pen to mark the documents, notes can be lifted more easily from the document if they are written in a special color. For example, a red pen could be used on a black and white document and the document scanned in using only the red channel.

In a fourth extension, capturing variable metadata in the document, as described above, the data collected from the meeting will be contained in the scanned image of the document. Capturing metadata from the documents is difficult because the marks on the document are made in free hand and handwriting recognition is not currently feasible. Metadata may be added at the meeting in one of two ways. First, like flowport, the glyph can encode information about which part of the document to look for a check mark. Selections can be made at the meeting that can be converted back into electronic metadata. For example, at a technical document panel review, a list of selections numbered 1-5 could be added to the document to indicate the rating each member of the technical panel gives the technical document. Second, a defined portion of the document can be designated to be decoded. A simplified alphabet such as Graffiti can be written in this area and translated back into electronically readable text.

Thus, there has been described one aspect of the invention, namely, a method 300 of providing visual access to comment markings that are supplied by a plurality of N meeting participants 1, the method comprising (a) providing (step 31) one or more meeting documents 10 to the N meeting participants 1, wherein each meeting document 10 comprises a human-readable content marking 11 related to the subject of the meeting and a storage address marking 12; (b) by the meeting participants 1, supplying (step 32) one or more comment markings 15 to the one or more meeting documents 10', thus forming one or more commented meeting documents 10'; (c) scanning (step 33) the one or more commented meeting documents 10' to form one or more commented meeting document images 10"; (d) storing (step 34) the one or more commented meeting document images 10" in a repository 5 based on the storage address marking 12; and (e) providing (step 35) one or more users 9 with visual access 8 to the one or more commented meeting documents images 10", thus enabling the one or more users 9 to view the one or more comment markings 15 that are supplied by the meeting participants 1.

While various embodiments of a method of providing visual access to comment markings, in accordance with the present invention, have been described hereinabove, the scope of the invention is defined by the following claims.

What is claimed is:

1. A computer-implemented method of providing visual access to comment markings that are supplied by a plurality of meeting participants, said method comprising:
    creating printed meeting documents using a printer having a print driver that automatically includes metadata in said printed meeting documents, each printed meeting document comprising a human-readable content marking related to a subject of a meeting attended by said plurality of meeting participants, a personal marking that identifies a corresponding meeting participant to whom said printed meeting documents is provided, and a storage address marking, said print driver automatically determining a location in said printed meeting documents for said human-readable content marking, said personal marking, and said storage address marking;
    providing one or more printed meeting documents to each of said plurality of meeting participants;
    at least one of said plurality of meeting participants, supplying one or more comment markings to said one or more printed meeting documents, thus forming one or more commented meeting documents;
    scanning, using a scanner, said one or more commented meeting documents, thus forming one or more commented meeting document images;
    storing said one or more commented meeting document images in a computer storage repository based on said storage address marking; and
    providing one or more users visual access to said one or more commented meeting document images, thus enabling said one or more users to view said one or more comment markings that are supplied by said at least one of said plurality of meeting participants,
    said one or more commented meeting document images further comprising said personal marking corresponding to said one or more comment markings allowing said one or more users to identify said one or more meeting participants who supply said one or more comment markings.

2. The method of claim 1, each meeting participant being provided with at least one meeting document.

3. The method of claim 1, each meeting participant being provided with exactly one meeting document.

4. The method of claim 1, said one or more users comprising said plurality of meeting participants.

5. The method of claim 1, said storage address marking being machine-readable.

6. The method of claim 5, said storage address marking being invisible to the human eye.

7. The method of claim 5, said storage address marking comprising a bar code.

8. The method of claim 5, said storage address marking comprising a data glyph.

9. The method of claim 1, said supplying one or more comment markings further comprising marking said one or more printed meeting documents using a marking device.

10. The method of claim 9, said marking device comprising a hand-held marking device.

11. The method of claim 10, said hand-held marking device comprising one of a pencil, pen, and crayon.

12. The method of claim 1, said meeting documents being printed based on meeting document information stored in said computer storage repository.

13. The method of claim 12, said providing one or more printed meeting documents further comprising transmitting said meeting document information to said printer.

14. The method of claim 1, said personal marking being machine-readable.

15. The method of claim 14, said personal marking being invisible to the human eye.

16. The method of claim 14, said personal marking comprising a bar code.

17. The method of claim 14, said personal marking comprising a data glyph.

18. The method of claim 1, each of said one or more printed meeting documents further comprising a meeting marking that identifies or describes said meeting.

19. The method of claim 18, said meeting marking being machine-readable.

20. The method of claim 19, said meeting marking being invisible to the human eye.

21. The method of claim 19, said meeting marking comprising a bar code.

22. The method of claim 19, said meeting marking comprising a data glyph.

23. A computer-implemented method of providing visual access to comment markings that are supplied by a plurality of meeting participants, said method comprising:
    providing one or more meeting documents to each of said plurality of meeting participants, said providing one or more meeting documents comprising:
        adding metadata to meeting document information using a data glyph encoder storing said metadata in an image that can be printed with said one or more meeting documents, said metadata identifying a location in a computer storage repository, and
        creating said one or more meeting documents using a printer based on said meeting document information and said metadata, said printer having a print driver that automatically includes said metadata in said one or more meeting documents,
        each printed meeting document comprising a human-readable content marking related to a subject of a meeting attended by said plurality of meeting participants, a personal marking that identifies a corresponding meeting participant to whom said one or more printed meeting documents is provided, and a storage address marking, said print driver automatically determining a location in said printed meeting document for said human-readable content marking and said personal marking;
    at least one of said plurality of meeting participants, supplying one or more comment markings to said one or more meeting documents, thus forming one or more commented meeting documents;

scanning, using a scanner, said one or more commented meeting documents, thus forming one or more commented meeting document images;

storing said one or more commented meeting document images in said computer storage repository based on said storage address marking; and providing one or more users visual access to said one or more commented meeting document images, thus enabling said one or more users to view said one or more comment markings that are supplied by said at least one of said plurality of meeting participants, said one or more commented meeting document images further comprising said personal marking corresponding to said one or more comment markings allowing said one or more users to identify said one or more meeting participants who supply said one or more comment markings.

24. A computer-implemented method of providing visual access to comment markings that are supplied by a plurality of meeting participants, said method comprising:

creating one or more printed meeting documents using a printer having a print driver that automatically includes metadata in said printed meeting documents, each printed meeting document comprising a human-readable content marking related to a subject of a meeting attended by said plurality of meeting participants, a personal marking that identifies a meeting participant to whom said one or more printed meeting documents is provided, and a storage address marking, said print driver automatically determining a location in said printed meeting documents for said human-readable content marking, said personal marking, and said storage address marking, said print driver automatically determining a location in said printed meeting documents for said human-readable content marking, said personal marking, and said storage address marking;

providing one or more printed meeting documents to each of said plurality of meeting participants, said personal marking comprising a name of said meeting participant and a glyph containing an identifier for said meeting participant, said printer comprising a data glyph encoder storing said metadata in an image that can be printed with said one or more printed meeting documents;

at least one of said plurality of meeting participants, supplying one or more comment markings to said one or more printed meeting documents, thus forming one or more commented meeting documents;

scanning, using a scanner, said one or more commented meeting documents, thus forming one or more commented meeting document images;

storing said one or more commented meeting document images in a computer storage repository based on said storage address marking; and providing one or more users visual access to said one or more commented meeting document images, thus enabling said one or more users to view said one or more comment markings that are supplied by said at least one of said plurality of meeting participants, said one or more commented meeting document images further comprising said personal marking corresponding to said one or more comment markings allowing said one or more users to identify said one or more meeting participants who supply said one or more comment markings.

25. The method of claim 1, said printer further comprising a data glyph encoder, said data glyph encoder storing said metadata in an image that can be printed with said printed meeting documents.

* * * * *